US006766424B1

United States Patent
Wilson

(10) Patent No.: US 6,766,424 B1
(45) Date of Patent: Jul. 20, 2004

(54) COMPUTER ARCHITECTURE WITH DYNAMIC SUB-PAGE PLACEMENT

(75) Inventor: Kenneth Mark Wilson, San Bruno, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 706 days.

(21) Appl. No.: 09/246,490

(22) Filed: Feb. 9, 1999

(51) Int. Cl.[7] .............................................. G06F 12/00
(52) U.S. Cl. ...................................................... 711/148
(58) Field of Search ................................. 711/141, 147, 711/148, 206, 207, 208, 209

(56) References Cited

U.S. PATENT DOCUMENTS 5,297,265 A * 3/1994 Frank et al. ................. 395/400
5,710,907 A * 1/1998 Hagersten et al. ........... 395/475
5,893,144 A * 4/1999 Wood et al. ................. 711/122
5,926,829 A * 7/1999 Hagersten et al. ........... 711/120

* cited by examiner

Primary Examiner—Kevin Verbrugge

(57) ABSTRACT

A multiprocessor system, where the latencies to access areas of memory have different values, provides the capability of having the operating system use large page sizes while dynamic page placement manipulates subsets of the large pages without affecting translation look-aside buffers in the processors. A sub-page support structure is inserted between the processor and the network interface to remote memory that on a remote memory access determines if a local copy of the data exists and, if it does, to change the remote access to a local access. Where a sub-page in a remote memory has been migrated to a third UMA cell, the sub-page support structure also instructs the processor of the new memory location or passes the access along to the correct UMA cell.

18 Claims, 7 Drawing Sheets

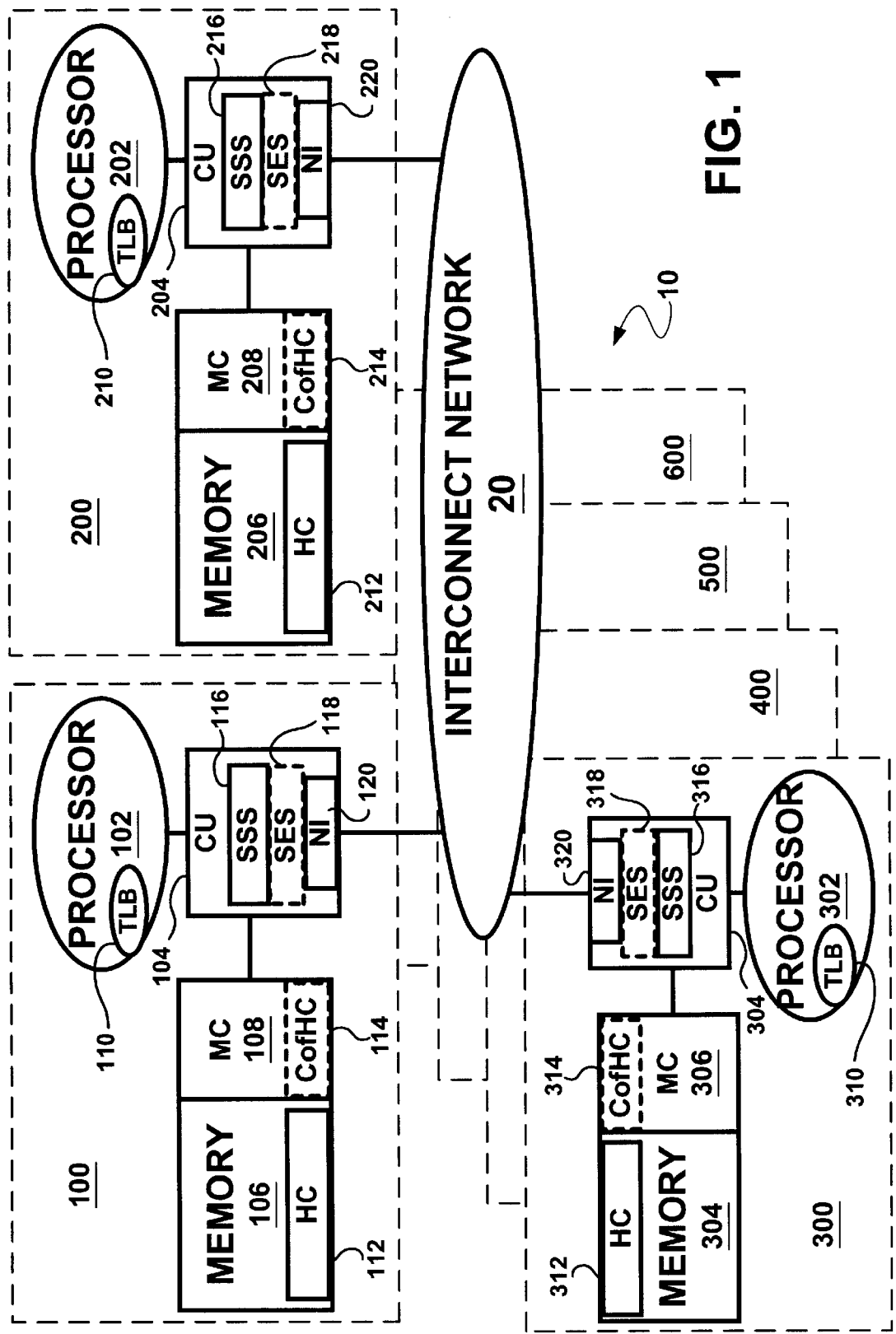

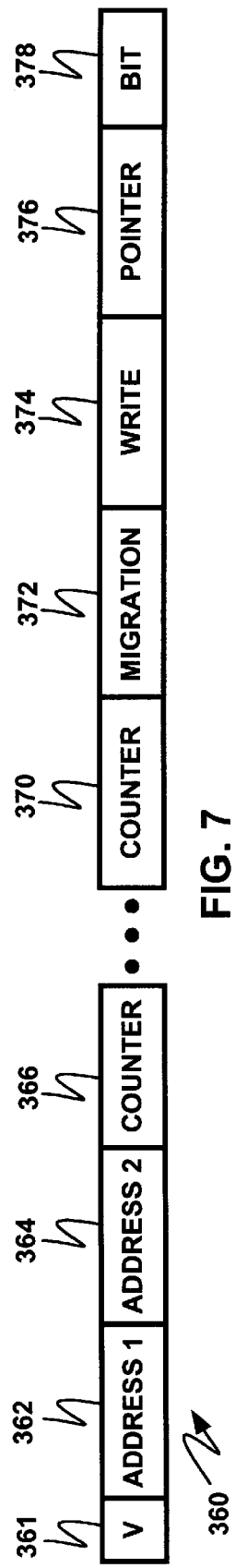
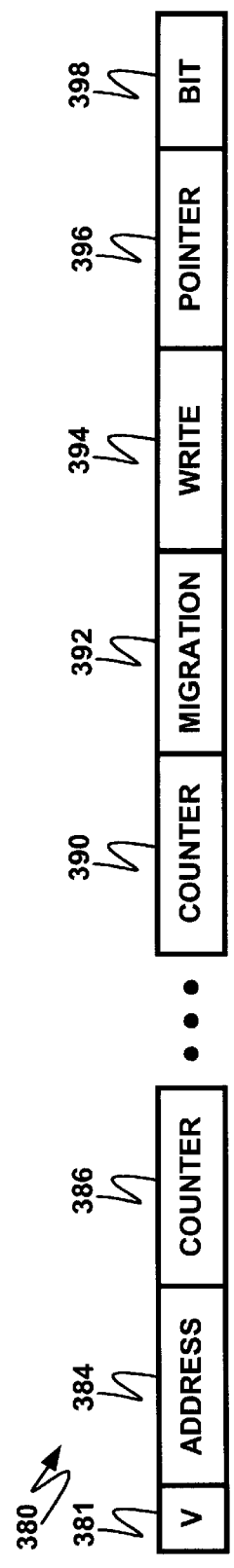
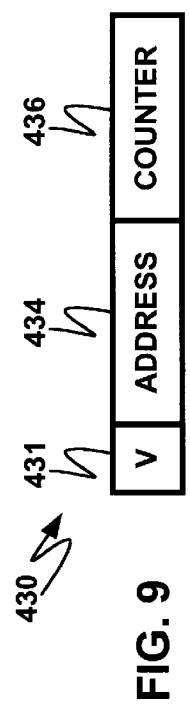

COMPUTER ARCHITECTURE WITH DYNAMIC SUB-PAGE PLACEMENT

CROSS-REFERENCE TO RELATED APPLICATION

The present application contains subject matter related to a concurrently filed U.S. patent application Ser. No. 09/246,479 by Kenneth M. Wilson entitled "COMPUTER ARCHITECTURE WITH CACHING OF HISTORY COUNTERS FOR DYNAMIC PAGE PLACEMENT". The related application is assigned to the same assignee as the present application and is incorporated by reference.

TECHNICAL FIELD

The present invention relates generally to high performance parallel computer systems and more particularly to dynamic page placement in cache coherent non-uniform memory architecture systems.

BACKGROUND ART

Many high performance parallel computer systems are built as a number of nodes interconnected by a general interconnect network (e.g., crossbar and hypercube), where each node contains a subset of the processors and memory in the system. While the memory in the system is distributed, several of these systems (called NUMA systems for Non-Uniform Memory Architecture) support a shared memory abstraction where all the memory in the system appears as a large memory common to all processors in the system.

These systems have to address the problem of where to place physical pages within the distributed memory system since the local memory is close to each processor. Any memory that is not local to the processor is considered remote memory. Remote memory has a longer access time than local memory, and different remote memories may have different access times. With multiple processors sharing memory pages and a finite size memory local to each processor, some percentage of the physical pages required by each processor will be located within remote physical memory. The chances that a physical page required by a processor is in local memory can be improved by using static page placement of physical memory pages.

Static page placement attempts to locate each physical memory page in the memory that causes the highest percentage of memory accesses to be local. Optimal physical memory page placement reduces the average memory access time and reduces the bandwidth consumed inside of the processor interconnect between processor nodes where there is uniform memory access time. The static page placement schemes include Don't Care, Single Node, Line Interleaved, Round Robin, First Touch, Optimal, etc., which are well known to those skilled in the art.

Dynamic page placement may be used after the initial static page placement to replicate or migrate the memory page to correct the initial placement or change the location due to changes in the particular application's access patterns to the memory page. The page placement mechanism, which is involved in the decision and copying/movement of the physical pages, may be in the multi-processor's operating system (OS) or in dedicated hardware.

A replication is the copying of a physical page so that two or more processors have a local copy of the page. As long as the memory accesses are reads, multiple copies of data can be allowed without causing coherence difficulties. As soon as a write to the page is sent to the memory system, either all copies of the page must be removed or an update coherence algorithm must be in place to make sure all of the pages have the same data.

A page migration is the movement of a physical memory page to a new location. The migration is usually permanent and does not require special handling as is required for writes to replicated pages.

An approach to dynamic page placement is described in the paper by Ben Verghese, Scott Devine, Anoop Gupta, and Mendel Rosenblum, "Operating System Support for Improving Data Locality on CC-NUMA Compute Servers", In ASPLOS VII, Cambridge, Mass., 1996.

In the past, dynamic page placement has been implemented by using a group of history counters for each memory page to keep track of how many accesses are made from each processor. It should be noted that memory accesses from a processor can also be thought of as cache misses to the processor's lowest level of cache. When these counters reach the preset thresholds discussed later, the page placement mechanism is made aware that there is a page in memory that has enough data on how it is accessed for the page placement mechanism to determine the optimal page placement. Once the optimal page placement has been determined, the page in memory can be migrated or replicated to the optimal uniform memory access (UMA) cell. A UMA cell is a grouping of memories which can be accessed by processors in the multi-processor system with the same access latency.

Dynamic page placement increases memory locality and therefore reduces latency and network traffic to improve performance. However, the technique performs best with a small page size. Even for an application like a database with a large data footprint, the standard buffer size is 2K bytes. With 2K byte data structures, there will be 512×1024 data structures in a 1-gigabyte page. With this many data structures on a single page, it is desirable to arrange the structures in such a way as to maximize locality to increase system performance. At worst case, with poor locality, the number of local memory accesses will be 1 divided by the number of UMA cells in the DSM system. For a 128-processor system with 2 processors per UMA cell, at worst case only $\frac{1}{64}^{th}$ of the memory accesses are local.

In addition, with so many data structures located on a single memory page, it is likely that all processors will be accessing each physical page equally. Therefore, static and dynamic page placement techniques will be unable to find a UMA cell to place a page to maximize local memory accesses and therefore improve performance. Further, memory page hotspotting will occur. Hotspotting is the creation of a bandwidth bottleneck due to multiple processors attempting to access the same memory structure at the same time.

Working against small page sizes is the fact that many current processors only contain 96 to 128 entry translation look-aside buffers (TLBs), which are the processor caches that translate virtual to physical addresses and keep track of recently used translations of virtual page numbers. The small size of the TLB requires large pages for good performance when running multiple applications or applications with large data or instruction footprints, for example 1-gigabyte physical pages.

To track the changes in the application's access patterns to the memory page, histories need to be maintained for every page in memory. A set of history counters is located close to the memory system for every physical page in memory and one counter is required for every UMA cell in the multi-processor system. Whenever a memory access is generated from a processor within a UMA cell, the counter representing the page and the cell for the processor performing the access is incremented.

There are two solutions for locating the counters: either within the memory itself or located in a separate hardware structure, such as the memory controller or the directory controller. Placing the counters within the memory has the advantage of keeping the cost down by using the existing DRAM in memory and the number of counters are automatically scaled with the installation of more memory. Unfortunately, this placement has the disadvantage of halving the memory bandwidth because of the accessing and updating of the counters. Placing the counters outside of memory adds a significant amount of hardware to the system because the hardware must be designed for the maximum amount of installable memory and also for the minimum physical page size.

Those skilled in the art currently teach that the future of multiprocessor systems lies in increasing the physical page size to offset the availability of only 96 to 128 TLB entries per processor rather than using a small page size to improve the percentage of local memory accesses. This is due to the long latency of handling TLB misses.

DISCLOSURE OF THE INVENTION

The present invention provides a multiprocessor system, where the latencies to access areas of memory have different values, with the capability of having the operating system use large page sizes while dynamic page placement manipulates subsets of the large pages without affecting the translation look-aside buffers of the processors. A sub-page support structure is inserted between the processor and the network interface to remote memory that on a remote memory access determines if a local copy of the data exists and, if it does, it changes the remote access to a local access.

The present invention also provides a sub-page support structure having history counters which instructs the processor of a new memory location or passes an access along to the correct UMA cell when a sub-page in a remote memory has been migrated to a third UMA cell.

The present invention further provides a system for dynamic page placement with physical memory sub-pages which consumes less bus bandwidth by moving smaller pages. Currently, those skilled in the art teach that system improvements can be best achieved by increasing physical page size.

The present invention further provides a system for dynamic page placement with physical memory sub-pages which alleviates false sharing within a memory page between processors.

The present invention further provides a system for dynamic page placement with physical memory sub-pages which alleviates the too few translation look-aside buffer entry problems.

The present invention further provides a system for dynamic page placement with physical memory sub-pages which removes the negative aspects of large page sizes.

The present invention further provides a system for dynamic page placement with physical memory sub-pages which does not prevent the entire page from being replicated or migrated.

The present invention further provides a system for dynamic page placement with physical memory sub-pages which eliminates updating of the translation look-aside buffer entries for sub-page migration and replication.

The above and additional advantages of the present invention will become apparent to those skilled in the art from a reading of the following detailed description when taken in conjunction with the accompanying drawings.

BRIEF DESCRIPTION OF THE DRAWINGS

FIG. 1 is a computer system incorporating the sub-page support structure (SSS) of the present invention;

FIG. 7 shows the entries of history counters for the SSS of the present invention;

FIG. 8 shows the entries of a cache of history counters in a memory controller;

FIG. 9 shows the entries for an optional sub-page enhancement structure (SES);

BEST MODE FOR CARRYING OUT THE INVENTION

Figure 3:
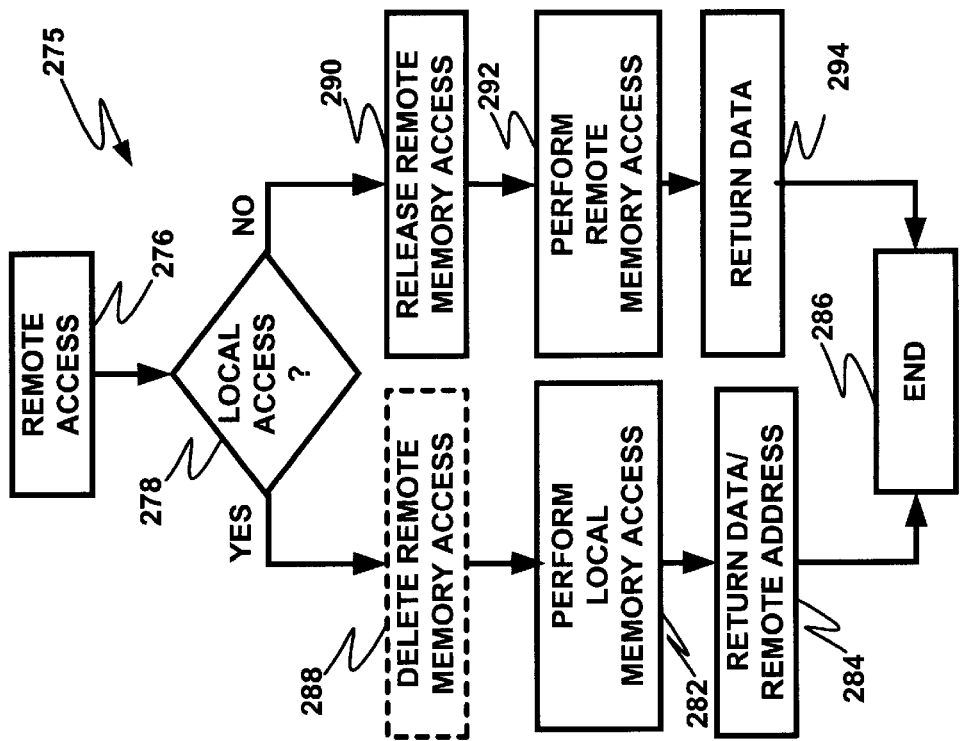
FIG. 3 shows the flow chart of the operations of the SSS of the present invention.

Referring now to FIG. 1, therein is shown a Distributed Shared Memory (DSM) multi-processor system 10, which is one example of a Non-Uniform Memory Architecture (NUMA) System. The multi-processor system 10 has a plurality of uniform memory access (UMA) cells 100, 200, 300, 400, etc. Each of the UMA cells 100, 200, etc. contains at least one memory and generally more than one processor. Within each UMA cell, any processor in the multi-processor system 10 can access all memories within the UMA cell with the same access latency. The UMA cells 100, 200, 300, 400, etc. are operatively connected to an interconnect network 20, which represents the conventional, general interconnect network between UMA cells, such as direct connections, crossbar switches, etc.

The minimal UMA cell contains a processor, a memory with a memory controller, and a control unit which connects the processor and the memory via the memory controller to the interconnect network 20. Thus, the UMA cell 100 contains a processor 102, a control unit (CU) 104, and a memory 106 with a memory controller (MC) 108. Similarly, the UMA cells 200, 300, 400, etc. have processors 202, etc., CUs 204, etc., and memories 206, etc., with MCs 208, etc.

The processor contains a translation look-aside buffer (TLB) while the memory could contain a counter and the MC could contain a cache of history counters. The CU includes a network interface (NI), a sub-page support structure (SSS) and an optional sub-page enhancement structure (SES). The SSS is a structure for allowing local retrieval of remotely requested data if it is available from a local UMA cell, as will later be described. This would reduce access time when the data is available locally but may increase it if it is not. The SES is a structure for reducing or removing the additional delay when no portion of the physical page is available locally, as will later be described. Thus, the processors 102, 202, etc. respectively contain TLBs 110, 210, etc., while the memories 106, 206, etc. respectively contain history counters (HCs) 112, 212, etc. and the MCs 108, 208, etc. respectively could contain cache of history counters (C of HC) 114, 214, etc. It would be understood by those skilled in the art that either history counters or cache of history counters could be used with the present invention.

According to the present invention, the SSSs 116, 216, etc. could be disposed in a number of different locations within the DSM multi-processor system 10 with varying trade-offs which would be obvious to those having ordinary skill in the art. Thus, the SSS can be in self-contained hardware or have operative associations with the processors, the interconnect network, the memories, the memory controllers, etc. In the best mode, the SSSs 116, 216, etc. are respectively located in the CUs 104, 204, etc. between the respective processors 102, 202, etc. and the NIs 120, 220, etc. which are on the path to the remote memories. When the optional SESs 118, 218, etc. are used, they are located near the respective SSSs 116, 216, etc.

Similarly, the HCs 112, 212, etc. can be in self-contained hardware or can have operative associations with the processors, the interconnect network, the memories, the memory controllers, etc. In one mode, the HCs 112, 212 are respectively located in the memories 106, 206, etc. Dynamic sub-page placement requires a set of HCs for every memory page. With the use of sub-pages, an additional set of counters is required for every sub-page if the sub-page is smaller than the minimum page size. For example, if a 4K sub-page is used, a set of history counters is required for every 4K block of main memory. The DSM multi-processor system 10 could operate using history counters 112, 212, etc. located in the respective memories 106, 206, etc.

In the best mode, using the cache of history counters can substantially reduce the number of history counters. Thus, optional CofHCs 114, 214, etc., respectively located in the MCs 108, 208, etc., would be used rather than the HCs. The cache of history counters is described in the related co-filed application to K. Wilson, supra, which is incorporate herein by reference thereto. The respective MCs 108, 208, etc. and respective processors 102, 202, etc. are respectively and operatively connected by components in the NIs 116, 216, etc. to the interconnect network 20.

Figure 2:
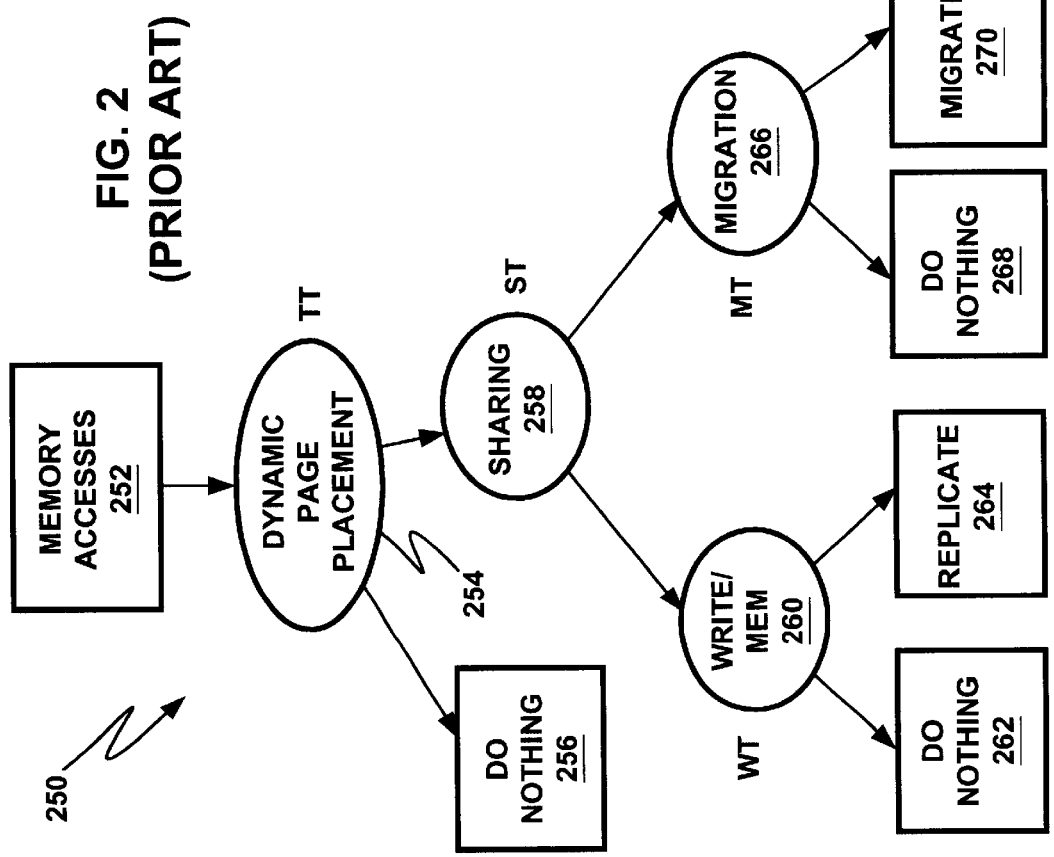
FIG. 2 (PRIOR ART) shows a replication/migration decision process useable with the present invention.

Referring now to FIG. 2 (PRIOR ART), therein is shown a "replication/migration" decision process 250 used with the present invention. The process 250 in the present invention is used not only for dynamic page but also for sub-page placement to decide if nothing should be done, if a page/sub-page should be replicated, or if a page/sub-page should be migrated to a different memory location. Dynamic page placement, as previously explained, increases memory locality and therefore reduces network traffic and improves performance. It will have the same effect on dynamic sub-page placement. The approach, described by B. Verghese, et al, supra, is used in the present invention only for descriptive purposes and it should be understood that there are other approaches which could also be utilized. For example, the best mode and Verghese utilize the computer operating system (OS, not shown), but a dedicated hardware system could also be utilized.

The count of memory accesses to various pages/sub-pages in memory, as represented by "memory access" block 252, are provided to the HCs. The HCs values are provided to a "dynamic page placement" decision block 254. The values and time intervals for the various thresholds to be reached would be determined by those skilled in the art based on optimizing various operational parameters of the particular computer architecture and applications involved.

The operation of the "dynamic page placement" decision block 254 is based on a Trigger Threshold (TT) which is a predetermined number of memory accesses after which migration/replication of a particular page/sub-page is considered. If the memory accesses to the page/sub-page are below the TT, the decision is made to do nothing and the OS is not involved as indicated by the "do nothing block" 256. If the memory accesses to the page/sub-page reach or exceed the threshold, a decision needs to be made and the decision mechanism branches to the "sharing" decision block 258.

The "sharing" decision block 258 operates based on a preset Sharing Threshold (ST) which is the number of memory accesses from another processor after which replication is considered. If the ST is exceeded, the decision process branches to the "write frequency and memory pressure (write/mem)" decision block 260.

The "write frequency and memory pressure" decision block 260 operates on how often the page/sub-page is accessed for writes and how much of the memory is being consumed by dynamic page/sub-page placement. If there are a large number of local writes to the page/sub-page or the OS determines that too much memory is being consumed by the dynamic page/sub-page placement process, a Write Threshold (WT) will be exceeded after which there is no replication of the page/sub-page. If the write frequency or memory pressure is high, the decision process branches to the "do nothing block" 262. If both are low, the decision is made to replicate the page/sub-page under consideration as indicated by "replicate" block 264.

Referring back to the "sharing" decision block 258, if the Sharing Threshold is not exceeded, the decision process branches to the "migration" decision block 266. The "migration" decision block 266 operates based on a Migrate Threshold (MT) which is the number of migrates after which a page/sub-page should not be migrated. If the number of migrates exceeds the MT, the decision is to do nothing as indicated by the "do nothing" block 268. If the migration rate is low, the decision is to migrate the page/sub-page under consideration as indicated by a "migrate" block 270.

It should be understood that it is also possible that both replication and migration may occur simultaneously based on memory accesses from a plurality of processors to multiple pages/sub-pages. Also, a replicated or migrated page/sub-page may later be replicated or migrated again due to changes in memory access patterns.

Referring now to FIG. 3, therein is shown the operating process 275 of a typical sub-page support structure, such as the SSS 116. When a remote access is to be performed, as indicated by the "remote access" block 276, a determination is first made at "local access?" decision block 278 to determine if a remote memory access can be satisfied locally. For example, for the processor 102, this is accomplished by checking in the SSS 116 to see if there is a local copy of the sub-page containing the requested address. If a local access is possible, the local address will be returned and a local memory access can be performed at "perform local memory access" block 282 on memory 106. After the local memory access has been performed, the data from the local memory access along with the original remote address of the memory access from the processor 102 are returned to the processor 102 at "return data/remote address" block 284 and the process ends at "end" block 286.

To reduce latency, one approach would be to allow a local access to be performed while a remote access is underway. Subsequently, the later returned remote access data would be ignored. However, to minimize system traffic due to the remote access and data return, it would be preferable to have a convenient buffer (not shown, but which could be in the NI or interconnect network 20) for holding the remote access request. Then, when a local access could be performed, a signal from an optional "delete remote memory access" block 288 could be sent to the buffer to delete the remote access request.

If no local address is returned because there is no local copy of the sub-page containing the requested address, the "local access?" decision block 278 determines that the data cannot be accessed locally. A signal is then sent to the buffer holding the remote memory access request to release the memory access to proceed normally as indicated by "release remote memory access" block 290. This ends involvement of the SSS 116.

The remote memory access is then performed by the system in the conventional manner at the "perform remote memory access" block 292 and then the data in the remote memory is returned at "return data" block 294 before the process ends at block 286.

Figure 4:
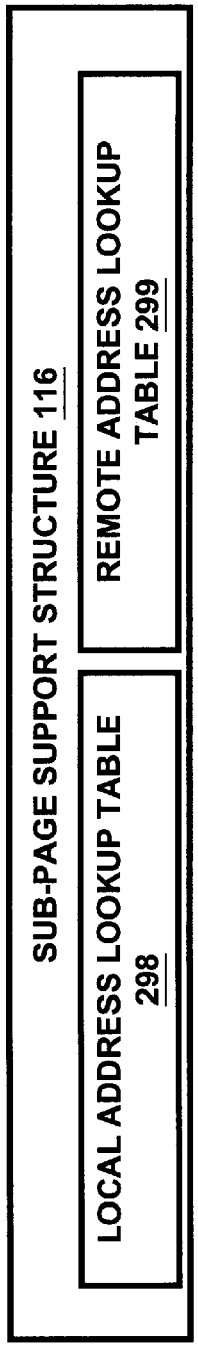
FIG. 4 is the SSS of the present invention.

Referring now to FIG. 4, therein is shown a typical sub-page support structure, such as the SSS 116. The SSS 116 contains a local address lookup table 298 and an optional remote address lookup table 299. The local address lookup table 298 holds the address of any migrated or replicated sub-page that resides on the local UMA cell 100. The optional remote address lookup table 299 holds the address of any, or a selected few, migrated or replicated sub-pages that reside on a remote UMA cell.

Figure 5:
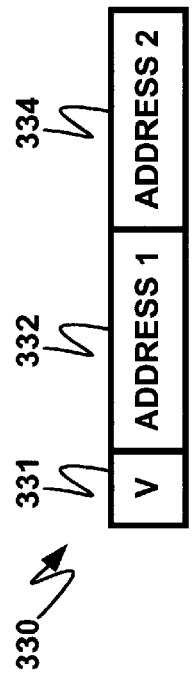
FIG. 5 shows the entries in the SSS of the present invention.

Referring now to FIG. 5, therein is shown the entries in local address lookup table 298, entry 330 having a valid bit 331, and address 1 and address 2 fields 332 and 334, respectively. The valid bit 331 indicates if the data in the entries are valid. The address 1 field 332 contains the remote address of a sub-page and the address 2 field 334 contains the local address of the remote sub-page located within local memory. When a remote access request is made, the remote address is provided to the SSS 116 which uses the local address lookup table 298 to find the local address in address 2 field 334. When the requested data is returned from the memory, the remote address, not the local address, is returned to the requesting local processor 102.

Figure 6:
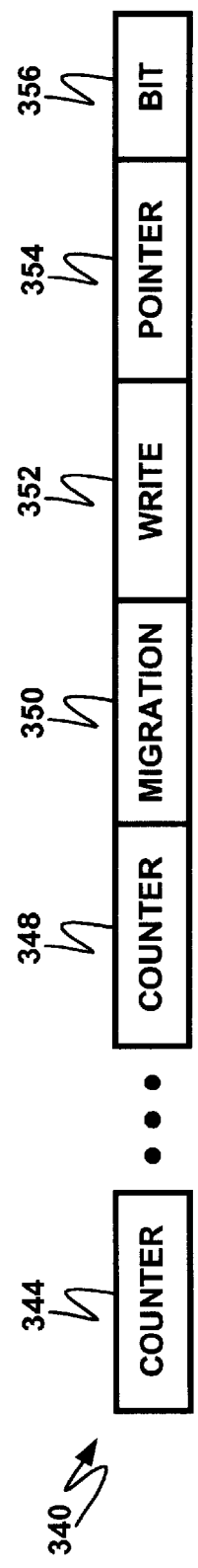
FIG. 6 shows the entries of history counters attached to every sub-page in memory.

Referring now to FIG. 6, therein is shown the entries 340 for the history counters in memory to be attached to every sub-page. A HC 112 has history counter fields, one counter for every UMA cell, which are first through last HCs 344 through 348, respectively. The counters are incremented upon each memory access by the appropriate processor. A migration counter 350 is a counter that is incremented upon every migration of the sub-page. A write counter 352 is a counter that is incremented upon every write to the sub-page. In the case of a migration, dynamic pointer 354 is used to keep track of the UMA cell to which the sub-page has been migrated. And, a read-only bit 356 is set if the sub-page has been replicated. If both the dynamic pointer 354 and the read-only bit 356 are zero, the sub-page has neither been replicated nor migrated. The dynamic pointer 354 and read-only bit 356 are required for sub-page dynamic page placement while the other fields are implementation dependent. Referring now to FIG. 7, therein are shown the entries 360 which can be used with the local address lookup table 298 when a history counter, such as HC 112, is used. The entries 360 have a valid bit 361, an address 1 field 362, an address 2 field 364, and a plurality of counter fields 366 through 370. The valid bit 361 indicates if the data in the entries are valid. The address 1 field 362 is the remote physical address used by the processor to address the sub-page block. The address 2 field 364 is the local physical address of the migrated or replicated sub-page that is local to the requesting processor. And, the plurality of counters 366 through 370 are the counters for the replicated/migrated sub-pages. Those skilled in the art would understand that implementing a hash table or cache-like structure could reduce the latency of accessing the local address lookup table 298. The counters are incremented upon each memory access by the appropriate processor. Again, a migration counter 372 is a counter that is incremented upon every migration of the sub-page. Again, a write counter 374 is a counter that is incremented upon every write to the sub-page. Again, a dynamic pointer 376 is used to keep track of the UMA cell to which the sub-page has been migrated. And again, a read-only bit 378 is set if the sub-page has been replicated. If both the dynamic pointer 376 and the read-only bit 378 are zero, the sub-page has neither been replicated nor migrated. Again, the dynamic pointer 376 and read-only bit 378 are required for sub-page dynamic page placement while the other fields are implementation dependent.

Referring now to FIG. 8, therein are shown the entries 380 which are used with a cache of history counters, such as CofHCs 114 in the MC 108. The entries 380 have a valid bit 381, an address field 384, and a plurality of counter fields 386 through 390. The valid bit 361 indicates if the data in the entries are valid. The address field 384 is the local physical address of the migrated or replicated sub-page that is local to the requesting processor. And, the plurality of counters 386 through 390 are the counters for the local sub-pages. When a cache of history counters is used, the counters 366 through 370 of FIG. 7 added to the local address lookup table 298 reduce pollution of the cache of history counters. Those skilled in the art would understand that implementing a hash table or cache-like structure could reduce the latency of accessing the local address lookup table 298. The counters are incremented upon each memory access by the appropriate processor. Again, a migration counter 392 is a counter that is incremented upon every migration of the sub-page. Again, a write counter 394 is a counter that is incremented upon every write to the sub-page. Again, a dynamic pointer 396 is used to keep track of the UMA cell to which the sub-page has been migrated. And again, a read-only bit 398 is set if the sub-page has been replicated. If both the dynamic pointer 396 and the read-only bit 398 are zero, the sub-page has neither been replicated nor migrated. Again, the dynamic pointer 396 and read-only bit 398 are required for dynamic sub-page placement while the other fields are implementation dependent.

The addresses for local or remote accesses in FIG. 1 are used for accessing memory according to the process of FIG. 3 and the entries in the counters of FIGS. 6, 7, 8, or 9 are used for making dynamic sub-page placement decisions using the process of FIG. 2 (PRIOR ART). For the most part, the operation of dynamic sub-page placement is the same as for dynamic page placement. The differences, where the SSS is used, are shown by reference to FIGS. 10, 11 and 12.

Referring now to FIG. 9, therein are shown the entries 430 which are used with the optional SES 118. The entries 430 have a valid bit 431, an address field 434, and a counter field 436. The valid bit 431 indicates if the data in the entries are valid. The address field 434 contains the address of an OS memory page that has one or more sub-blocks currently located within the SSS 116 and is used to check for whether part of the page is located in the local memory. The counter field 436 is the count of the number of sub-pages belonging to the memory page that are held locally. This field could be used to make it easier to determine when an entry should be removed from the SSS 116. If the count reaches zero, there are no local sub-pages and the entry can be removed without having to check the SSS 116. If the count is high, it may also be worthwhile to replicate or migrate the entire page.

Figure 10:
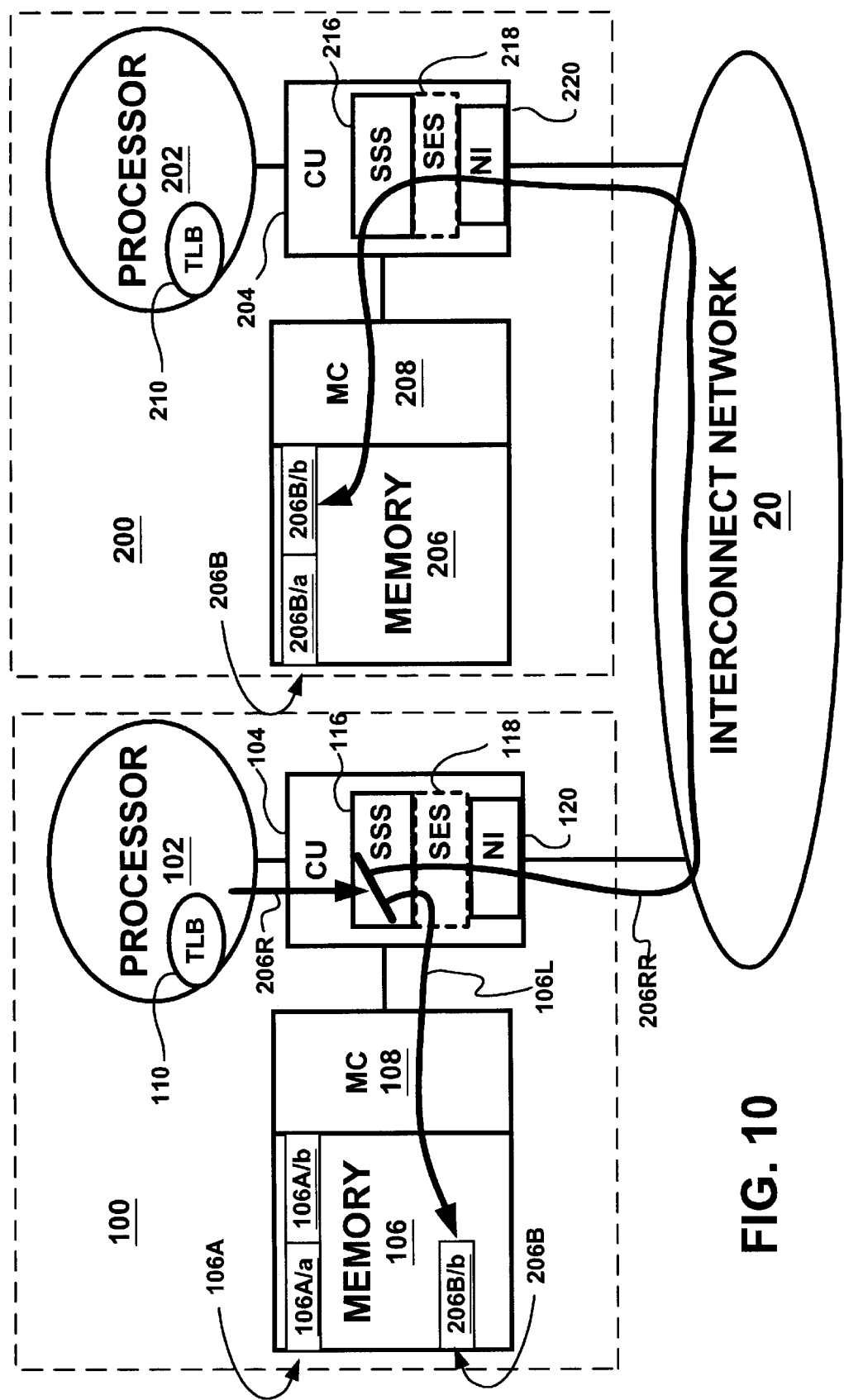
FIG. 10 shows a local access to a replicated sub-page in local memory for a remote access request from a local processor.

Referring now to FIG. 10, therein is shown the DSM multi-processor system 100 performing a local access to a local replicated sub-page 106L for a remote access request 206R from the local processor 102. The DSM multi-processor system 100 is shown with the remote memory 206 having a page 206B with sub-pages 206B/a and 206B/b and with memory 106 having a page 106A with sub-pages 106A/a and 106A/b. The sub-page 206B/b is shown replicated in the memory 106 due to dynamic sub-page placement and the remote home sub-page 206B/b still in the memory 206. The processor 102 makes a remote access request 206R. In the SSS 116, a local access 106L is performed and/or a remote access request remote access 206RR to sub-page 206B/b in memory 206.

In operation, the remote access request 206R for sub-page 206B/b from the processor 102 through the SSS 116 uses the local address lookup table 298 to determine if the sub-page is locally available. Since it is, the local memory access request 106L is performed. To reduce latency in the absence of a local sub-page, the remote memory access request 206RR could be simultaneously performed and the results ignored if a local sub-page is found.

In the best mode, the SSS 116 would delete the remote memory access request 206RR while the local memory access request 106L is started. The local memory access request 106L is then fulfilled with the return of the data from the sub-page 206B/b and the remote address.

The optional SES 116 is accessed in parallel and can use the OS page address to check for whether part of the page is located in the local memory. When no portion of the page is local, it will make a very fast decision to allow the remote access.

Figure 11:
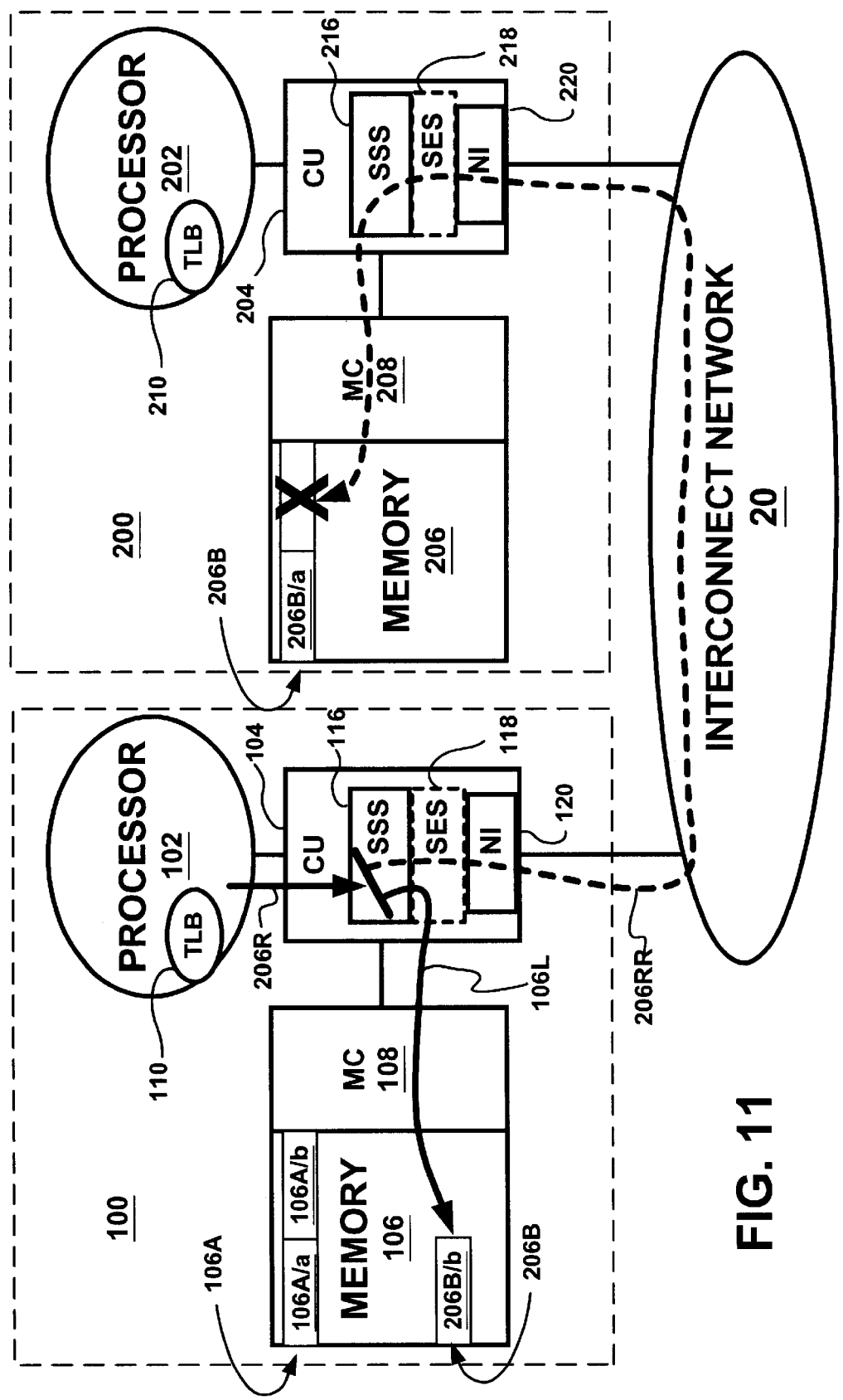
FIG. 11 shows a local access to a local migrated sub-page for a remote access request from a local processor.

Referring now to FIG. 11, therein is shown the DSM multi-processor system 100 performing a local access to a migrated sub-page for a remote access request 206R from the local processor 102. The DSM multi-processor system 100 is shown with the memory 206 having the page 206B with a sub-page 206B/a and with memory 106 having a migrated sub-page 206B/b. The sub-page 206B/b is shown migrated to the memory 106 due to dynamic sub-page placement and the "X" in the memory 206 indicates that the sub-page no longer resides in the memory 206. The processor 102 makes the remote access request 206R. In the SSS 116, a local access 106 L is performed and the remote access 206RR is not performed since the sub-page 206B/b is no longer in the memory 206.

Figure 12:
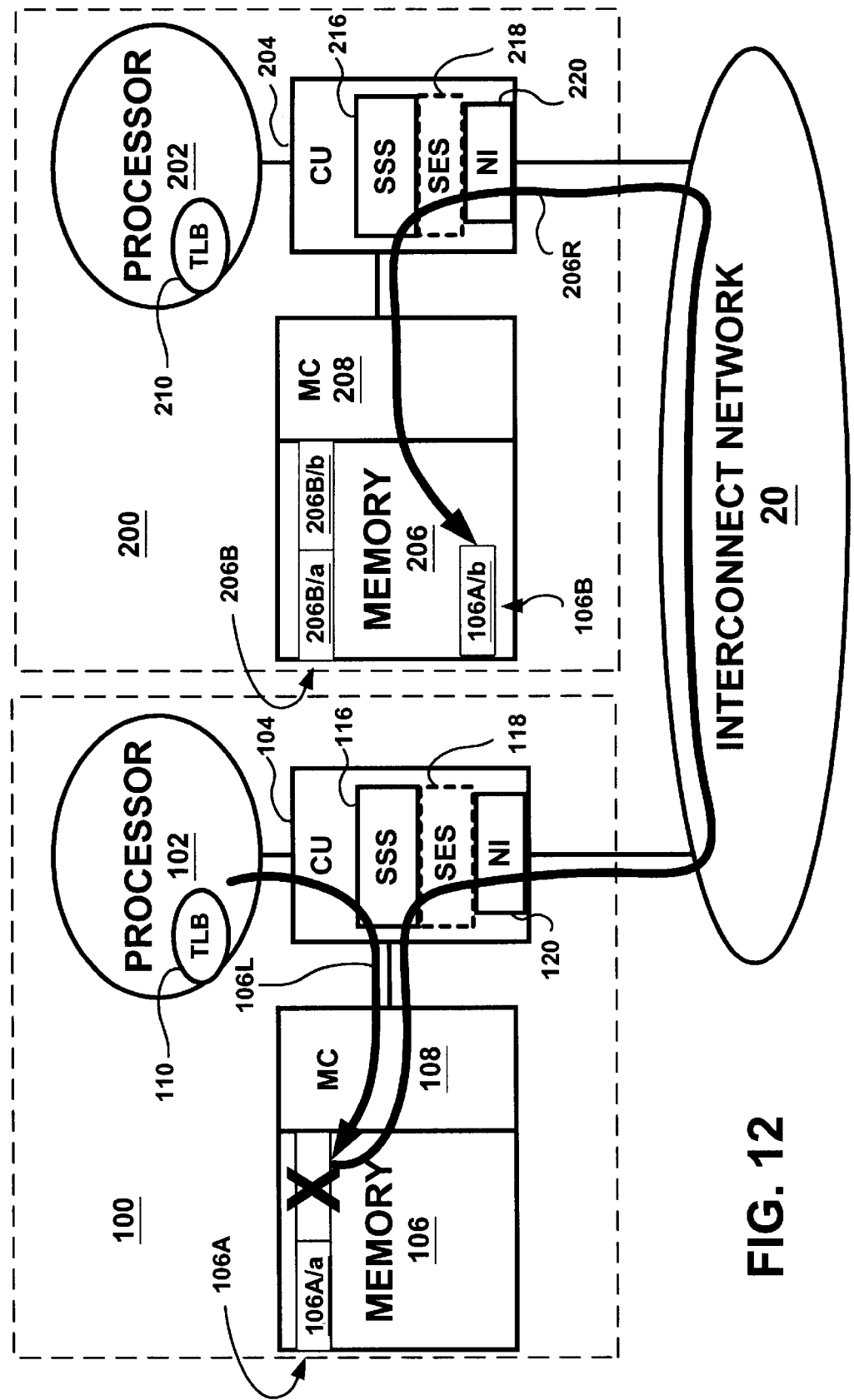
FIG. 12 shows a transferred local access to a remote migrated sub-page for a local access request from a local processor.

Referring now to FIG. 12, therein is shown the DSM multi-processor system 100 performing a local access 106L to the sub-page 106A/b in the page 106A where the sub-page has been migrated. The "X" in the memory 106 indicates that the sub-page 106A/b no longer resides in the memory 106. The dynamic pointer contains the new location of the sub-page 106A/b in memory 206. Then a remote access request 206R is sent to the memory 206.

In an alternate embodiment, there is a remote address lookup table 299, which assists in locating the migrated page with reduced latency. In operation, the local access request 106L for sub-page 106A/b from the processor 102 through the SSS 116 elicits a response that the sub-page has been migrated. The remote address lookup table 299 points to the remote memory address in memory 206 and to forward the local access request, which is now remote memory access 206R, to the sub-page 106A/b in memory 206. The local access request 106L is then fulfilled.

It should be understood that using sub-page memory blocks does not prevent the migration or replication of entire memory pages by the page placement mechanism performing dynamic page placement. Gathering the information for migration/replication of entire memory pages will take longer with the sub-page method since multiple sets of counters at the page and sub-page level must be reviewed to make migration/replication decisions. However, this disadvantage can be removed by the use of the cache of history counters since it provides the option of allocating a separate entry for the entire page as well as the sub-pages. This has the disadvantage of two cache lookups per access, but this can be alleviated by using a banked cache structure or two separate cache structures. The second cache structure could be made much smaller due to the low number of TLB entries requiring fewer entries for the memory pages.

On a local access for a sub-page or page which has not been migrated, the access performs normally. Dynamic page migration/replication still requires the proper counter to be incremented. A local access to a migrated page, as shown in FIG 12, is the only special case. If a local access is to a sub-page migrated to another UMA cell, then the memory request must be forwarded to the correct UMA cell. For optimum performance in the case of a separate hardware structure, such as the cache of history counters, the implementation is designed in such a way that the check to see if a page has been migrated is performed at the same time as the actual accessing of memory.

On a remote access, the processor uses the TLB to determine the location then the processor itself performs the access. The processor making a remote memory access expects the requested data to reside in a remote UMA cell when the dynamic page placement may have made the requested data local. Since the processor does not know that the access may now be local, the SSS is placed in the path of all remote data accesses. The SSS checks if a memory access can be made local, as shown in FIGS. 10 and 11. If it can be made local, the SSS prevents the remote memory access from being placed on the interconnect network (remote memory access request 206RR would be deleted from FIG. 10). A remote memory access will only occur when it is known that the data can only be accessed remotely.

The SSS determines if a remote memory access can be satisfied locally. It may optionally send a signal to the buffer holding the remote memory access to delete or release the memory access. Then a local memory access is performed, and returns the data to the processor with the address of the original remote memory access. This is performed as described by the process 275 of FIG. 3 and as hereinafter described. A buffer in the interconnect network 20 or the NI 120 will hold the remote memory access. Any convenient network buffer may be used, but it must be able to delay the access and delete it if required or just ignore the returning data.

The SSS may be located within the CU, interconnect network, the network interface, the memory controller, or a sub-set in each. The optimal location will depend upon the specific design used to build the multiprocessor system. The SSS 116 uses the local address lookup table 298 to determine from a given address whether the sub-page containing the address resides within the local memory, and, if the sub-page is local, the local memory address. There is also a one-bit wire to inform the network buffer whether to release or delete the remote memory access for which the table lookup was performed. It should be noted that to keep the additional latency of the sub-page table lookup minimized, it probably is necessary for the table to be located on-chip and, depending on the design of the multiprocessor system, probably located in the CU. It should be further noted, that the data still resides in main memory and just the table of addresses and possibly the dynamic memory counters are on-chip.

There are three alternate embodiments of the SSS.

First, the table in the SSS can be implemented as a cache to improve latency. Instead of using a CAM (Content Addressable Memory) to find the correct entry in the table, a hash table, a banking structure using high order bits (e.g., one bank per processor) or a cache structure with the options of multiple ports, multiple banks, associativity, etc. may be used.

Second, since the lookup is already being performed, the counters associated with each sub-page could be located with the corresponding entry in the SSS. This is especially useful when using a cache of history counters to prevent pollution of the cache.

Third, a smaller table structure, the optional SES 116, located next to the SSS 118 which can be accessed in parallel and can use the OS page address to check for whether part of the page is located in the cache. This provides a two-tier remote access latency since just because the page address is in the table does not mean the sub-block is local, but it will make for very fast decisions when no portion of the page is local.

On a remote memory access to data that is not maintained locally, the access will perform as normal (with a small delay due to the check for locally replicated or migrated data) except for the case where the access is to a migrated sub-page as shown in FIG. 12. An access to a migrated sub-page that is not local to the requesting processor will access the memory home page as expected, but will find that the data has been migrated. This means that the access must be passed on to the UMA cell that contains the current copy of the data. The implementation of this special case can be simplified by treating it much like a cache-to-cache access, but where the data is located in another processor's memory instead of another processor's cache.

Another approach for handling accesses to remote memory where the sub-page has been migrated elsewhere is to inform the memory local to the requesting processor of the new location of the migrated sub-page. This location can be added to a new table or current table within the SSS to correct the address of remote accesses to migrated data as well as remote accesses to data that was dynamically placed local to the processor.

This approach will reduce the access to migrated data by one hop, but would require the SSS to inform the interconnect network controller (not shown) of the new address. If there are 256 memory calls, then an eight-bit bus should be added. This change will also require more entries to be allocated in the local address lookup table 298 and therefore will require a larger or more associative local address lookup table. Another problem is that, when a migrated sub-page is moved again, all the UMA cells holding pointers to the sub-page must be informed or a provision must be added to make sure there is a way to detect an access to a migrated sub-page that is no longer there. Such a detection is easy to perform since, if the sub-page is no longer there, then neither is the entry in the local address lookup table 298. It is necessary then to access the local address lookup table 298 with all accesses to memory instead of just access from local processors. If the entry is not located in the table, then the requesting processor will have to be informed, and the memory access resent to the home memory location of the sub-page. Accessing the local address lookup table 298 with all memory accesses to the node instead of just memory access from local processors would require more ports added to the local address lookup table 298, increasing the latency of local address lookup table 298 accesses. The degree of improvement of this approach will depend on the cc-NUMA system in which it is incorporated.

All replicated pages are read only and upon a write to a replicated page there is an interrupt and all but one of the replicated pages is removed. Prior to using sub-pages, there was a choice of which replication to keep. In the present invention, there is a home cell where the full page is located so the copy that resides in the home cell should always be kept unless a migration is desired in which case the home node sub-page pointer must be updated.

With the local address lookup table 298 in the SSS 116, the operating system (OS) does not need to be involved when there is a memory access to a page located in the TLB. One alternative is to have the OS handle the migration/replication of sub-pages the same way it handles the migration/replication of pages by reading the counters on an interrupt and deciding if a page should be migrated/replicated.

As would be evident to those skilled in the art, the above assumes that there is no remote or memory cache located in each cell. With the addition of a remote or memory cache, the present invention becomes easier to implement and can be considered a subset of the present invention.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A computer architecture comprising:

a first and a second memory;

a processor operatively connected to access said first and said second memory;

said first and second memory capable of having portions of sub-pages migrated and replicated therebetween;

a sub-page support structure operatively associated with said processor and said memories;

said sub-page support structure including a mechanism responsive to said processor access to said second memory for a predetermined portion of a sub-page to determine if said processor access to said second memory can be satisfied by a processor access to said first memory for said predetermined portions of said sub-page migrated or replicated thereto from said second memory; and a local access mechanism for performing a processor access to said first memory when said first memory contains said predetermined portion of said sub-page.

2. The computer architecture as claimed in claim 1 including:
   a return mechanism for returning said predetermined portion of said sub-page from said first and said second memory; and
   a mechanism operatively associated with said processor for causing said processor to ignore said predetermined portion of said sub-page returned from said second memory when said predetermined portion of said sub-page has already been returned from said first memory.

3. The computer architecture as claimed in claim 1 including:
   a holding mechanism for holding of said processor access to said second memory for said predetermined portion of a sub-page; and
   said sub-page support structure including a delete mechanism for deleting said processor access to said second memory when said first memory contains said predetermined portion of said sub-page.

4. The computer architecture as claimed in claim 1 including:
   a buffer for holding of said processor access to said second memory for said predetermined portion of a sub-page; and
   said sub-page support structure including a release mechanism for releasing said buffer holding of said processor access to said second memory when said first memory fails to contain said predetermined portion of said sub-page.

5. The computer architecture as claimed in claim 1 including:
   a forwarding mechanism operatively associated with said sub-page support mechanism for forwarding of said processor access to said first memory to said second memory when said first memory indicates said predetermined portion of said sub-page has been migrated to said second memory.

6. The computer architecture as claimed in claim 1 including:
   a page mechanism for indicating, for said processor access to said second memory for said predetermined portion of said sub-page, that said page containing said sub-page is absent from said first memory.

7. The computer architecture as claimed in claim 1 including:
   a first and second memory controllers operatively connected to said first and said second memory, respectively;
   a network interface operatively connecting said processor to said first memory and first memory controller;
   an interconnect network operatively connected to said network interface and said second memory and second memory controller; and
   said sub-page support structure operatively associated with an element comprising the group consisting of said processor, said first memory, said first memory controller, said network interface, said interconnect network, and combinations thereof.

8. A computer architecture comprising:
   a plurality of memories;
   a processor operatively connected to access said plurality of memories with at least one of said plurality of memories local thereto and at least one of said plurality of memories remote therefrom;
   said plurality of memories capable of having portions of sub-pages migrated and replicated among said plurality of memories;
   a sub-page support structure operatively associated with said processor and said memories;
   said sub-page support structure including a mechanism responsive to said processor access to a remote address in a remote memory for a predetermined portion of a sub-page to return a local memory address when said original address is in a local memory;
   a local access mechanism operatively associated with said sub-page support structure, said local access mechanism responsive to said return of said local memory address for performing a processor access to said predetermined portion of said sub-page in said local memory; and
   said sub-page support structure including a return mechanism for returning said remote memory address and said predetermined portion of said sub-page to said processor from said local memory.

9. The computer architecture as claimed in claim 8 including:
   a mechanism operatively associated with said processor for causing said processor to ignore said predetermined portion of said sub-page returned from said remote memory when said predetermined portion of said sub-page has already been returned from said local memory.

10. The computer architecture as claimed in claim 8 including:
    a buffer for holding of said processor access to said remote memory for said predetermined portion of a sub-page; and
    said sub-page support structure including a delete mechanism for deleting said buffer holding of said processor access to said remote memory when said local memory contains said predetermined portion of said sub-page.

11. The computer architecture as claimed in claim 8 including:
    a buffer for holding of said processor access to said remote memory for said predetermined portion of a sub-page; and
    said sub-page support structure including a release mechanism for releasing said buffer holding of said processor access to said remote memory when said local memory fails to contain said predetermined portion of said sub-page; and
    a return mechanism operatively associated with said sub-page support structure to return said predetermined portion of said sub-page from said remote memory to said processor.

12. The computer architecture as claimed in claim 8 including:
    a forwarding mechanism operatively associated with said sub-page support mechanism for forwarding of said processor access to said local memory to a further remote memory when said local memory indicates said predetermined portion of said sub-page has been migrated to said further remote memory.

13. The computer architecture as claimed in claim 8 including:
    a page mechanism for indicating for said processor access to said remote memory for said predetermined portion of said sub-page that said page containing said sub-page is absent from said local memory.

14. The computer architecture as claimed in claim 8 including:
    a plurality of memory controllers operatively and individually connected to each of said plurality of memories;

a plurality of network interfaces operatively and individually connecting each of said plurality of memories and each of said plurality of memory controllers;

an interconnect network operatively connected to said plurality of network interfaces; and said sub-page support structure operatively associated with an element comprising the group consisting of said processor, said interconnect network, said plurality of memories, said plurality of memory controllers, said plurality of network interfaces, and combinations thereof.

15. The computer architecture as claimed in claim 8 wherein:

said mechanism responsive to said processor access to a remote address in a remote memory is implemented as an element from a group consisting of a lookup table, a cache, a lookup table with a CAM, a hash table, a banking structure with one bank for said processor, a cache structure with multiple ports, a cache structure with multiple banks, and a cache structure with associativity.

16. The computer architecture as claimed in claim 8 including:

counters associated with said sub-page; and said mechanism responsive to said processor access to a remote address in a remote memory have said counters operatively associated therewith.

17. The computer architecture as claimed in claim 8 including:

an allocation mechanism for allocating pages to said plurality of memories; and a home page mechanism for maintaining said pages in said plurality of memories where said pages are originally allocated.

18. The computer architecture as claimed in claim 8 including:

a dedicated hardware mechanism for migrating and replicating sub-pages and portions thereof.

* * * * *